Patented July 22, 1924.

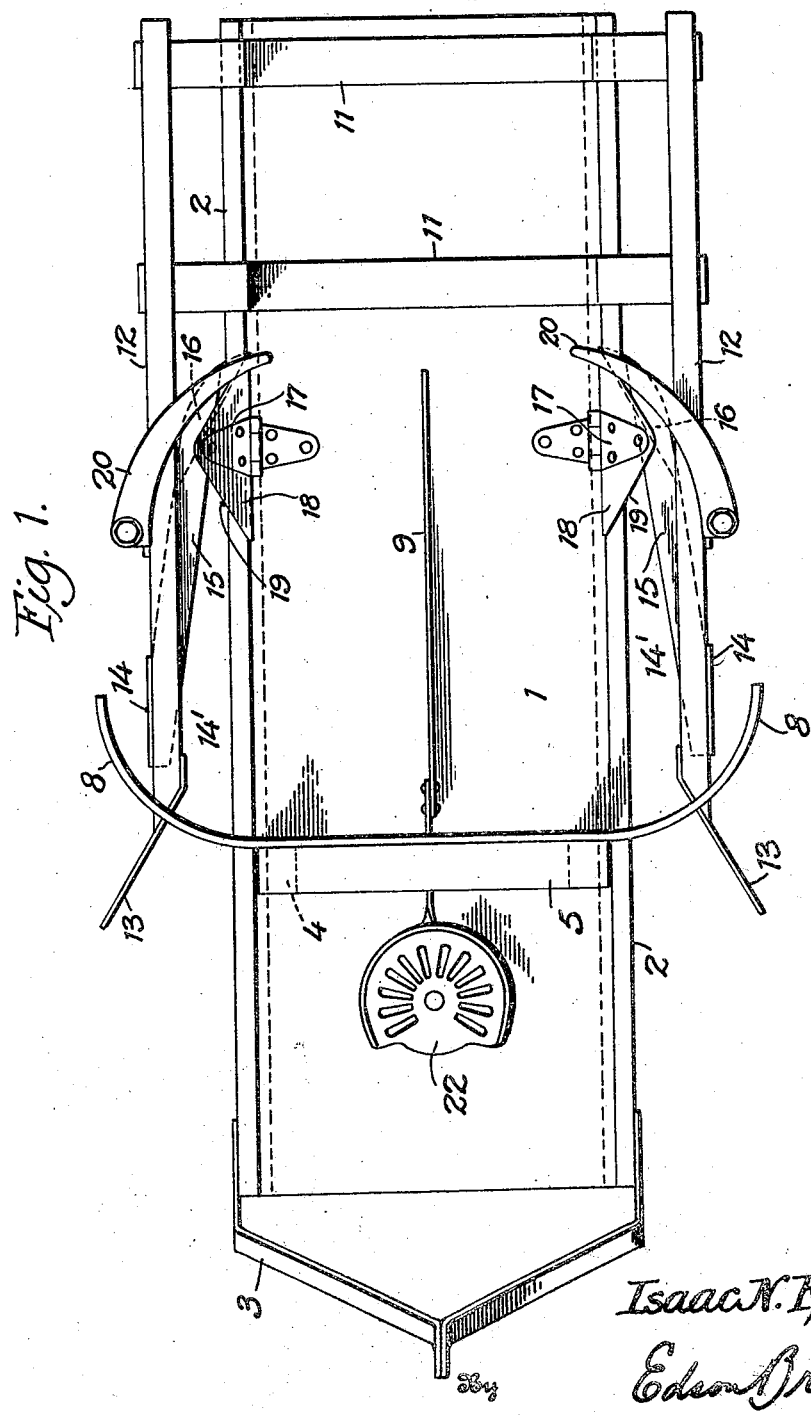

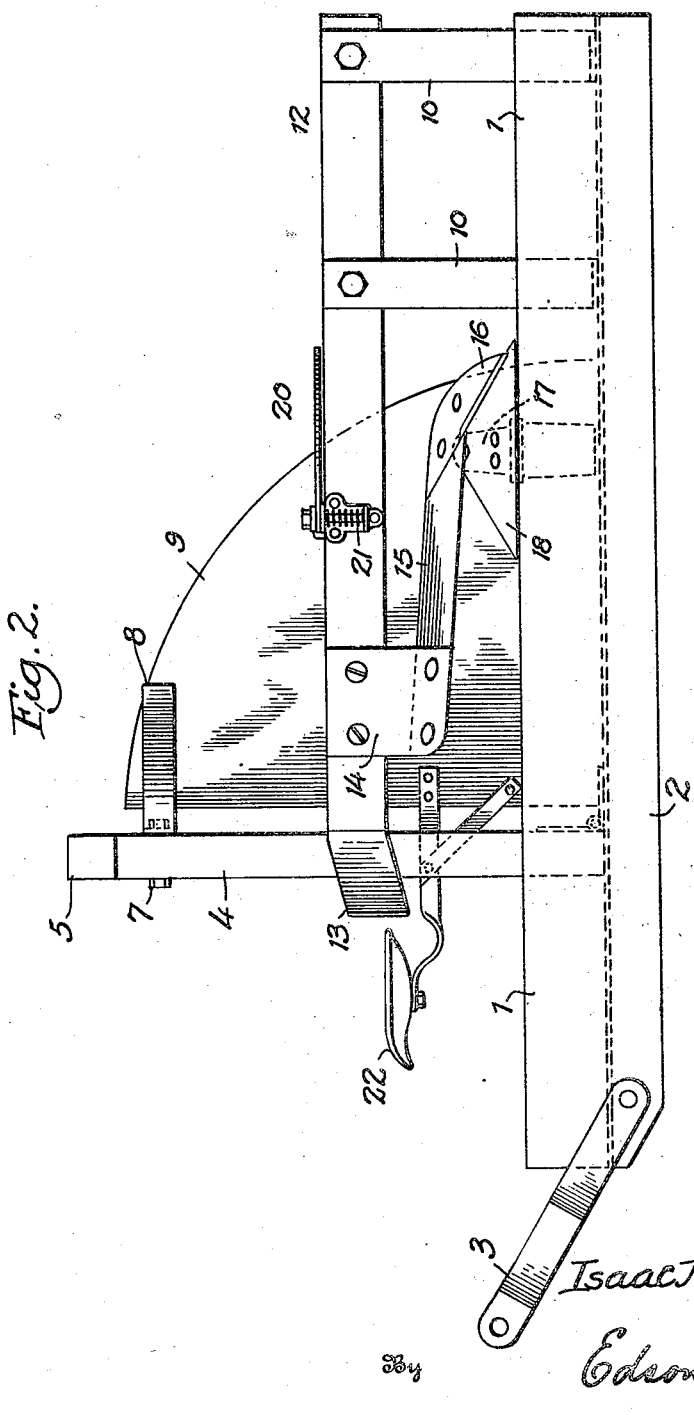

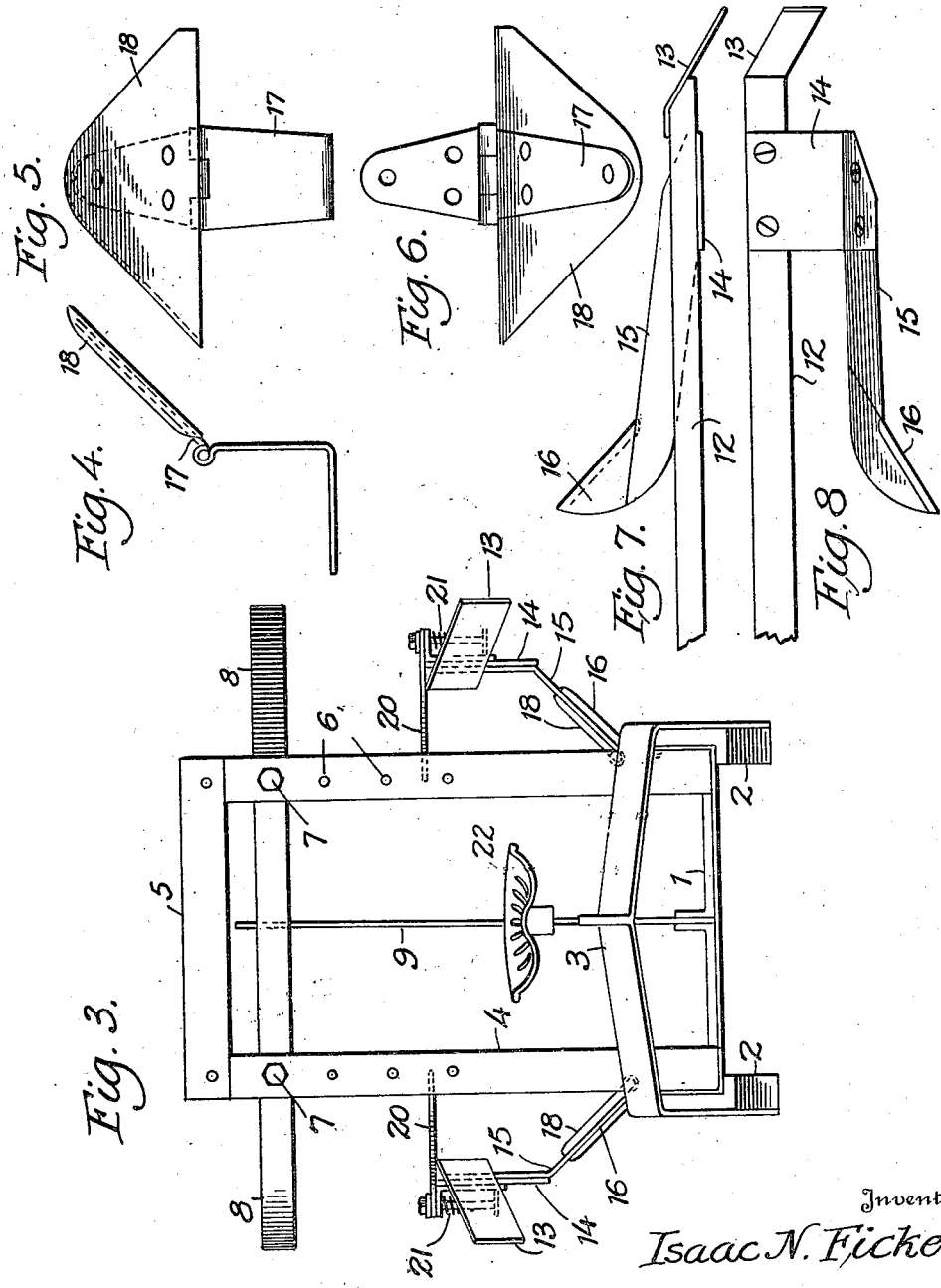

1,502,025

UNITED STATES PATENT OFFICE.

ISAAC N. FICKES, OF YORK, PENNSYLVANIA.

CORN HARVESTER.

Application filed October 20, 1923. Serial No. 669,785.

*To all whom it may concern:*

Be it known that I, ISAAC N. FICKES, a citizen of the United States, residing at York, in the county of York and State of Pennsylvania, have invented certain new and useful Improvements in Corn Harvesters, of which the following is a specification.

The present invention relates to corn harvesters.

An object of the invention is to provide a device for cutting corn stalks, which may be drawn through a corn field, and quickly and readily sever the stalks and collect them for further transportation in bulk.

A further object of the invention is to provide such a device which will act effectually to sever the stalks and throw the severed portions upon a platform or carriage.

A further object of the invention is to provide such a device having collapsible collecting or receiving arms for the severed corn stalks.

Further objects and advantages of the invention will appear from the following description taken in connection with the accompanying drawings, in which:

Figure 1, is a top plan view of a corn harvester embodying the present invention.

Figure 2, is a side elevation thereof.

Figure 3, is a front elevation of the corn harvester.

Fig. 4 is an edge elevation of the cutter shield,

Fig. 5 is a front elevation of the same,

Fig. 6 is a top plan view of the same,

Fig. 7 is a top plan view of the cutter and the cutter arm, and

Fig. 8 is a side elevation of the same.

Referring to the drawings, the reference numeral 1 indicates a platform which may conveniently be mounted upon side runners 2, it being understood, of course, that the platform may as well be mounted on wheels, if such a construction is deemed desirable.

Suitably secured to the front end of the platform 1 is any convenient form of draught means 3. Mounted upon the platform 1 toward the front thereof, are front uprights or standards 4, and extending across the tops thereof is a cross piece 5. The front uprights or standards 4 are provided with a series of openings 6 through which bolts 7 extend carrying the collecting arms 8. These arms may be attached to the front uprights or standards 4 at any desired height, depending upon the height of the severed corn stalks which they are to retain on the platform. These collecting arms 8 may be removed from the front uprights and standards 4 when the device is not in use and may be transported on the platform or carriage 1.

Extending substantially longitudinally of the platform 1 is a partition 9 upon one side of which the severed corn stalks are received from one side of the platform 1 and upon the other side of which the severed corn stalks are received from the other side of the platform.

Toward the rear of the platform are mounted four rear uprights or standards 10 carrying across their tops the two rear cross pieces 11 which extend laterally over the runners 2 and beyond the sides of the platform. The rear cross pieces 11 carry at their ends the side arms 12 which extend substantially horizontally along the sides of the platform beyond the side edges of the runners. The side arms 12 carry at their forward ends the spreading side arm guides 13 adapted to gather in the corn stalks from the rows on either side of the platform and guide them into the spaces 14' between the side arms 12 and the runners 2.

Attached to each of the side arms 12 is a cutter arm plate 14 which may conveniently be of yieldable metal. The cutter arm plates 14 carry the cutter arms 15 which extend downwardly, rearwardly and inwardly toward the platform 1. The cutter arms 15 carry at their lower and inner ends the cutting blades 16 which also extend in the general direction of the cutter arms 15, that is to say, downwardly, inwardly and rearwardly, with respect to the platform 1, the cutting blades extending in a general diagonal direction across the spaces 14'.

A hinged plate 17 is secured upon each side of the platform in proximity to the cutting blade 16 and each of these hinged plates 17 carries a self adjusting cutter shield 18, the edge 19 of which is sloped to form a wedge shaped opening between the cutter arm 15 and the cutter shield. This cutter shield is adapted to overlie the cutting blade but may be raised therefrom as hereinafter explained.

Each of the side arms 12 carries a pressure finger 20 which is hingedly mounted to swing in a horizontal plane. A convenient spring device herein illustrated as a coil spring 21, has one end secured to the side arm 12 and its other end secured to the pressure finger 20 and is under sufficient tension to urge the pressure finger 20 inwardly and forwardly of the platform.

A seat 22 may be secured to the harvester at any convenient place and is herein illustrated, by way of example, as being fastened to the vertical partition 9.

The operation of the device is as follows: The platform 2 is drawn between two rows of corn, the stalks of each row being urged inwardly into the spaces 14' by the outwardly extending side arm guides 13. Owing to the shape and direction of the cutter shield 18 it will be raised by a corn stalk as the corn stalk approaches the cutting blade and by the time the corn stalk reaches the cutting blade the cutter shield will be raised therefrom sufficiently to allow the cutting blade to function. The upper portion of the corn stalk before severance will have urged rearwardly the pressure finger 20, but, the moment the corn stalk is severed, the pressure finger 20, under the action of the spring 21, will thrust the severed corn stalk forwardly upon the platform between the partition 9 and the arm 8. When the corn stalk has been severed there is nothing to hold the cutter shield above the cutting blade and it drops down thereon where it remains until it is lifted by another corn stalk.

It will be observed that by the foregoing construction there has been provided a corn harvester which is adapted to gather in and sever corn stalks from two rows, one on either side of the harvester; one which is provided with a yieldably mounted cutting blade which will yield upon meeting with some abnormal resistance but which will effectively sever the corn stalk at the proper angle and permit the severed stalk to be readily thrust upon the platform by the pressure fingers 20; one which is provided with a self-adjusting and automatically operating cutter shield which overlies the cutting blade when the cutting blade is not functioning and which is raised above the cutting blade by the corn stalk itself to permit the corn stalk to be severed at the proper moment; one which is provided with adjustable and collapsible collecting arms which retain upon the platform the severed corn stalks and may be adjusted at will to suit the height of the stalks to be cut; one which is provided with a spring actuated pressure finger which throws forwardly upon the carriage each severed corn stalk as it is cut; and finally one which is relatively simple in construction, having the parts likely to cause damage protected when not in use and yet requiring no attention from the operator and one which automatically gathers and cuts the corn stalks and throws them forwardly upon the carriage.

What I claim is:

1. A corn-harvester comprising a platform, side arms carried thereby, outwardly extending guides on said side arms, yieldable plates on said side arms, cutter arms carried by said plates, cutting blades on said cutter arms, hinged shields overlying said blades and adapted to be raised by engagement with a corn stalk and to be lowered by their own weight, adjustable collector arms associated with said carriage near the forward end thereof, and spring actuated pressure fingers on said side arms adapted to throw severed corn stalks upon said carriage and into said collector arms.

2. In a corn harvester, a yieldably mounted cutting blade and a shield for said blade comprising a hinged plate normally overlying said blade and adapted to be raised by engagement with a corn stalk.

3. In a corn harvester, a platform having overhanging side arms, downwardly, rearwardly and inwardly extending cutting blades yieldably mounted on said side arms, and shields overlying said blades comprising hinged plates each having a diagonal stalk-engaging edge and adapted to be raised by engagement with a corn stalk to permit said blades to function.

In testimony whereof I affix my signature.

ISAAC N. FICKES.